US012588721B2

(12) United States Patent
Lee et al.

(10) Patent No.: US 12,588,721 B2
(45) Date of Patent: Mar. 31, 2026

(54) FACE MASK

(71) Applicant: TAL Apparel Limited, Kowloon (HK)

(72) Inventors: Harry Nai Shee Lee, Kowloon (HK);
Tommy Yuk Yin Siu, Kowloon (HK)

( * ) Notice: Subject to any disclaimer, the term of this
patent is extended or adjusted under 35
U.S.C. 154(b) by 1031 days.

(21) Appl. No.: 17/117,505

(22) Filed: Dec. 10, 2020

(65) Prior Publication Data

US 2022/0110383 A1      Apr. 14, 2022

(30) Foreign Application Priority Data

Oct. 12, 2020      (EP) ..................................... 20201325

(51) Int. Cl.
| | |
|---|---|
| *A41D 13/11* | (2006.01) |
| *A62B 18/02* | (2006.01) |
| *A62B 23/02* | (2006.01) |
| *B01D 39/08* | (2006.01) |
| *B32B 5/26* | (2006.01) |

(52) U.S. Cl.
CPC ...... *A41D 13/1161* (2013.01); *A41D 13/1192*
(2013.01); *A62B 23/025* (2013.01); *B01D*
*39/08* (2013.01); *B32B 5/267* (2021.05); *B32B*
*5/268* (2021.05); *B32B 5/275* (2021.05); *A62B*
*18/025* (2013.01)

(58) Field of Classification Search
CPC .............. A61F 13/00; A61F 2013/5108; A61F
2013/51078; B01D 39/08; B01D
2239/065; B01D 2239/0668; B01D
2239/0672; B01D 39/083; B29C 66/729;
D06M 17/00
See application file for complete search history.

(56) References Cited

U.S. PATENT DOCUMENTS

| | | | | |
|---|---|---|---|---|
| 5,503,907 | A | * | 4/1996 | Gessner .................... B32B 7/10 |
| | | | | 442/364 |
| 5,701,893 | A | | 12/1997 | Kern |
| 5,735,270 | A | | 4/1998 | Bayer |
| 5,786,058 | A | * | 7/1998 | Megchelsen ............ B29C 65/18 |
| | | | | 428/57 |

(Continued)

FOREIGN PATENT DOCUMENTS

| | | |
|---|---|---|
| CN | 2606602 Y | 3/2004 |
| CN | 2610955 Y | 4/2004 |

(Continued)

OTHER PUBLICATIONS

INDA Nonwovens Glossary 2012 (Year: 2012).*

(Continued)

*Primary Examiner* — Brandy S Lee
*Assistant Examiner* — Sara K Toich
(74) *Attorney, Agent, or Firm* — Woodard, Emhardt,
Henry, Reeves & Wagner

(57) ABSTRACT

The invention relates to a face mask comprising a compound
structure with an inner layer and two sandwich layers,
wherein
  the inner layer is made from a filter material for filtering
    particles and germs,
  the sandwich layers are made from a textile material,
  the inner layer is sandwiched by the sandwich layers, and
  the sandwich layers are bonded to the inner layer at least
    in sections along the perimeter of the face mask and in
    sections in the inner area of the face mask.
In this way, a reusable face mask with enhanced filtration
efficiency is provided.

16 Claims, 5 Drawing Sheets

(56) References Cited

U.S. PATENT DOCUMENTS

| | | | | |
|---|---|---|---|---|
| 6,057,024 | A * | 5/2000 | Mleziva | D04H 1/559 |
| | | | | 156/290 |
| 12,285,061 | B2 * | 4/2025 | Houde | B32B 5/26 |
| 2002/0182396 | A1 * | 12/2002 | DeLucia | B32B 3/266 |
| | | | | 428/297.4 |
| 2004/0000313 | A1 | 1/2004 | Gaynor | |
| 2008/0011303 | A1 * | 1/2008 | Angadjivand | D04H 3/16 |
| | | | | 128/206.19 |
| 2011/0039468 | A1 * | 2/2011 | Baldwin, Jr. | B32B 27/304 |
| | | | | 442/381 |
| 2011/0114095 | A1 | 5/2011 | Smith | |
| 2011/0209711 | A1 | 9/2011 | Brillat | |
| 2011/0232653 | A1 | 9/2011 | Imashiro | |
| 2014/0182593 | A1 * | 7/2014 | Duffy | A62B 23/025 |
| | | | | 128/206.19 |
| 2020/0164618 | A1 * | 5/2020 | Maze | B32B 27/12 |
| 2021/0052488 | A1 * | 2/2021 | Okazaki | A61M 15/00 |
| 2021/0086117 | A1 * | 3/2021 | Avril | B32B 38/06 |
| 2021/0329994 | A1 * | 10/2021 | Sun | A41D 31/02 |

FOREIGN PATENT DOCUMENTS

| | | | |
|---|---|---|---|
| CN | 2617412 | Y | 5/2004 |
| CN | 102131549 | A | 7/2011 |
| CN | 103734939 | A | 4/2014 |
| CN | 204091061 | U | 1/2015 |
| CN | 205492690 | U | 8/2016 |
| CN | 209965302 | U | 1/2020 |
| CN | 111227345 | A | 6/2020 |
| CN | 111493410 | A | 8/2020 |
| DE | 20108099 | U1 | 7/2002 |
| DE | 202020102076 | U1 | 7/2020 |
| WO | WO-2020090011 | A1 * | 5/2020 |

OTHER PUBLICATIONS

European Search Report received in related EP Application No. 20201325.6 dated Mar. 26, 2021 (p. 8).

Machine translation of CN111227345A by PatDocs on Apr. 19, 2021 (p. 23).

Machine translation of DE20108099U1 by European Patent Office Patent Translate on Apr. 19, 2021 (p. 20).

Machine translation of DE202020102076U1 by European Patent Office Patent Translate on Apr. 19, 2021 (p. 14).

Machine translation of CN103734939A by PatDocs PDF Export (p. 10).

Machine translation of CN111493410A by PatDocs PDF Export (p. 23).

Machine translation of CN204091061U by PatDocs PDF xport (p. 13).

Machine translation of CN205492690U by PatDocs PDF Export (p. 9).

Machine translation of CN209965302U by PatDocs PDF Export (p. 9).

Machine translation of CN2606602Y by PatDocs PDF Export (p. 9).

Machine translation of CN2610955Y by PatDocs PDF Export (p. 6).

Machine translation of CN2617412Y by PatDocs PDF Export (p. 6).

* cited by examiner

FACE MASK

CROSS-REFERENCE TO RELATED APPLICATIONS

This application claims priority to EP20201325.6 filed Oct. 12, 2020, which is hereby incorporated by reference.

BACKGROUND

The invention relates to a face mask comprising an inner layer and two sandwich layers, wherein the inner layer is made from a filter material for filtering particles and germs, the sandwich layers are made from a textile material, and the inner layer is sandwiched by the sandwich layers.

Different types of face masks are well known from the prior art. Basically, face masks can be divided into medical face masks, also call surgical face masks, respiratory masks, also called respirators, and face coverings which are simple mouth-nose protection devices. All face masks have in common that they may be worn on the face of a person, i.e. the wearer of the face mask, before the wearer's mouth and nose, for protecting the wearer of the face mask and/or others.

A N95 mask or N95 respirator is a particulate-filtering facepiece respirator that meets the US National Institute for Occupational Safety and Health (NIOSH) N95 classification of air filtration, which means that it filters at least 95% of airborne particles. The N95 type is the most common particulate-filtering facepiece respirator in the US. N95 respirators are considered functionally equivalent to certain respirators regulated under non-US jurisdictions, such as FFP2 respirators of the European Union and KN95 respirators of China. However, slightly different criteria are used to certify their performance, such as the filter efficiency, test agent and flow rate, and permissible pressure drop. N95 respirators require a fine mesh of synthetic polymer fibers, specifically a nonwoven polypropylene fabric. It is usually produced by melt blowing and forms the inner filtration layer that filters out hazardous particles.

In contrast to respirators, surgical face masks are loose-fitting, disposable devices that create a physical barrier between the mouth and nose of the wearer and potential contaminants in the immediate environment and the surrounding atmosphere. In the US, surgical face masks are regulated under 21 CFR 878.4040. Surgical masks are not to be shared and may be labeled as surgical, isolation, dental, or medical procedure masks. Surgical masks are made in different thicknesses and with different ability to protect the wearer from contact with liquids. These properties may also affect how easily the wearer can breathe through the face mask and how well the surgical mask protects the wearer. If worn properly, a surgical mask is meant to help block large-particle droplets, splashes, sprays, or splatter that may contain germs, e.g. viruses and bacteria, keeping it from reaching the wearer's mouth and nose. Surgical masks may also help reduce exposure of the wearer's saliva and respiratory secretions to others. While a surgical mask may be effective in blocking splashes and large-particle droplets, a face mask, by design, does not filter or block very small particles in the air that may be transmitted by coughs, sneezes, or certain medical procedures. Surgical masks also do not provide complete protection from germs and other contaminants because of the loose fit between the surface of the mask and the face.

Neither N95 respirators nor surgical face masks are intended to be used more than once. The fact that they are not reusable and have to be disposed of after wearing for a fixed number of hours results in a lot of waste and is not environmentally friendly.

Face coverings are not classified as personal protective equipment which is used in a limited number of settings to protect wearers against hazards and risks, such as surgical masks or respirators used in medical and industrial settings. Rather, face coverings are intended to protect others, not the wearer, against the spread of infection because they cover the nose and mouth, which are the main confirmed sources of transmission of certain viruses. Hence, such face coverings are suitable for reducing the respiratory droplets emission of a person wearing such a mask which may reduce the risk of infection of other persons in the proximity of the person who is wearing the mask. As mentioned above, such face coverings may be washable and, thus, may be reusable.

Therefore, it is the object of the invention to provide a reusable face mask with enhanced filtration efficiency.

This object is addressed by the subject matter of claim 1. Preferred embodiments are described in the dependent claims.

SUMMARY

Hence, the invention is related to a face mask comprising a compound structure with an inner layer and two sandwich layers, wherein the inner layer is made from a filter material for filtering particles and germs, the sandwich layers are made from a textile material, the inner layer is sandwiched by the sandwich layers, and the sandwich layers are bonded to the inner layer at least in sections along the perimeter of the face mask and in sections in the inner area of the face mask.

The inner area of the face mask is the area of the face mask which is surrounded by the perimeter of the face mask. Due to the fact, that—in contrast to conventional face masks—according to the invention the sandwich layers are bonded to the inner layer not only at least in sections along the perimeter of the face mask but also in sections in the inner area of the face mask a very durable product is achieved. This is due to the fact that the sandwich layers may act as a "skeleton" for the inner filter layer, i.e. by providing more stability and resistance to the inner layer. In this way, a face mask may be provided which is machine washable and can be tumble-dried thereafter for up to 50 to 100 times or even more without losing its general filter function. Therefore, a reusable and, thus, environmentally friendly face mask may be provided which does not have to be disposed of after having worn the face mask once.

According to a preferred embodiment of the invention the inner area of the face mask comprises such sections of the face mask which have a minimum distance from the perimeter of the face mask of at least 3 cm, more preferably of at least 2 cm, and even more preferably of at least 1 cm. In this way it may be achieved that the sandwich layers are bonded to the inner layer at least in such sections of the inner area of the face mask which cover the nostrils and the oral fissure of a person when the face mask is worn by this person. Preferably, the sandwich layers are bonded to the inner layer in more than 50% of the part of the face mask which is surrounded by its perimeter, more preferably in more than 65%, and most preferably in more than 80%. Further, according to a preferred embodiment of the invention, the sandwich layers are bonded to the inner layer over at least 70% of the surface on which they lie next to each other, more preferably over at least 80%, even more preferably over at least 90%, and most preferably over the entire surface on which they lie next to each other. In this way, a very stable and resistant design is achieved.

Conventional face masks are usually equipped with a device for holding the face mask at the desired location, i.e. in the face in front of the mouth and nose of the wearer. The same applies to the face mask according to the invention. Such a device for holding the face mask in the face of the wearer may comprise ear loops and/or a band for fixing it to the head of the person who wears the face mask. Such ear loops and/or bands may be made from a flexible material or from a non-stretchable material. In the latter case, the face mask is typically fixed to the head by tying open ends of the band together. The bonding of the sandwich layers to the inner layer at least in sections along the perimeter of the face mask is preferably done by stitching these layers together.

In general, the invention allows for different possibilities for bonding the sandwich layers to the inner layer which is important for the durability and performance of the face mask and makes it reusable for multiple times. However, according to a preferred embodiment of the invention, the sandwich layers are bonded to the inner layer in their inner area by a heat and pressure treatment. Such bonding of fabrics by heat and pressure itself are well known to the man skilled in the art. Preferably such heat and pressure treatment is performed at a temperature in the range between 95 and 130° C. and at pressures in the range of 1 to 15 N/cm². As already mentioned above, also when using such bonding by heat and pressure, according to a preferred embodiment of the invention, the sandwich layers are bonded to the inner layer over the entire surface on which they lie next to each other. This provides for a very durable structure of the face mask.

Alternatively or in addition to such a bonding by heat and pressure, according to a preferred embodiment of the invention, the sandwich layers are bonded to the inner layer in their inner area by ultrasound bonding. Ultrasound bonding of fabrics itself is well known to the man skilled in the art. For example, such ultrasound bonding is often used in the technical field of the manufacturing of face masks when attaching ear loops to the main body of the face mask. If such an ultrasound bonding process is added, i.e. is used in addition to the bonding by heat and pressure washing durability is significantly improved.

When bonding the sandwich layers to the inner layer in their inner area by ultrasound bonding, according to a preferred embodiment of the invention, the three layers are bonded together by multiple ultrasound bondings which are applied to the three layers when they are stacked one over the other in such a way that the inner layer is sandwiched by the sandwich layers. In other words, according to this preferred embodiment of the invention, a respective single ultrasound bonding is applied to all three layers together.

Preferably, such ultrasound bondings are provided in at least 80% of the area in which the inner layer is sandwiched by the sandwich layers, more preferably in at least 90% of this area and most preferably in the complete area in which the inner layer is sandwiched by the sandwich layers. The feature that ultrasound bondings are provided in at least 80% of the area in which the inner layer is sandwiched by the sandwich layers does not mean that 80% of this area is ultrasound bonded together but that in 80% of this area, such ultrasound bondings may be found, i.e. that in 80% of this area ultrasound bondings with a respective distance from each other are provided.

The arrangement of the ultrasound bondings relative to each other may follow different designs. Especially, it is not necessary that the arrangement of the ultrasound bondings follows a regular pattern. Rather, according to a preferred embodiment, the ultrasound bondings are arranged in an irregular way, i.e. without a repeating pattern and with different distances from each other. Such an arrangement of the ultrasound bondings is also referred to as being "random" or a "random pattern". In the alternative, according to a preferred embodiment of the invention, the sandwich layers are bonded to the inner layer in a regular way. The face mask may also comprise areas with irregular ultrasound bondings and areas in which the ultrasound bondings follow a specific pattern, respectively.

As mentioned above, the ultrasound bonding rows may be arranged in different ways in the inner area of the face mask. Especially, the ultrasound bonding rows do not have to follow a specific pattern. However, according to a preferred embodiment of the invention the ultrasound bondings are arranged along ultrasound bonding rows which run through the inner area of the mask, preferably from one point on the perimeter to another point of the perimeter. In this context, the term "ultrasound bonding rows" refers to ultrasound bonding connections in continuous rows of dotted lines with equal or different spacings. Further, in this respect, the ultrasound bonding rows are comprised of ultrasound bonding connections of the sandwich layers with the inner layers, these connections of one ultrasound bonding row being arranged at a distance from each other.

Further, according to one preferred embodiment of the invention, the ultrasound bonding rows are arranged as pairs of ultrasound bonding rows which are parallel to each other and which have a distance from each other which is smaller than the distance of one ultrasound bonding row of the pair of ultrasound bonding rows to the next closer ultrasound bonding row of another pair of ultrasound bonding rows. In this respect, the pairs of ultrasound bonding rows preferably run parallel to their neighboring pairs of ultrasound bonding rows. The distances between the ultrasound bonding rows may vary. However, according to a preferred embodiment of the invention, the distance between an ultrasound bonding row of one pair of ultrasound bonding rows to the neighboring ultrasound bonding row of a neighboring ultrasound bonding row is less than 4 cm, preferably less than 2.54 cm, and most preferably less than 1.27 cm. Further, it is preferred that the distance of the ultrasound bonding rows of a single pair of ultrasound bonding rows is less than 0.5 cm, preferably less than 0.4 cm, and most preferably less than 0.25 cm. According to another preferred embodiment of the invention, the ultrasound bonding rows are not arranged as pairs of ultrasound bonding rows which are parallel to each other but as single rows which run parallel to their neighboring rows and wherein these rows are preferably equally spaced from each other. Preferably, the distance from one ultrasound bond to the next ultrasound bond, i.e. the ultrasound bond which is nearest, is 1.5 cm or less, more preferably 1 cm or less.

In general, it would be possible that the sandwich layers cover the inner layer only partly. However, according to a preferred embodiment of the invention, the sandwich layers cover the inner layer completely. This makes the face mask more durable, especially for withstanding multiple home laundering and tumble-dry cycles.

The inner layer may, in general, be made from any suitable filter material. However, according to a preferred embodiment of the invention, the inner layer is made from a melt-blown non-woven material, preferably from a melt-blown polypropylene non-woven material.

Further, according to a preferred embodiment of the invention, the inner layer is made from a material which shows a particle filtration efficiency (PFE) of 95% or more, preferably of 97% or more, most preferably of 99% or more, for particles with a particle size of 0.3 μm, wherein the PFE is determined according to the ASTM F2299 standard and wherein the PFE relates to the filter of the unwashed face mask. In this respect, it is worth mentioning that the ASTM F2299 standard refers to a particle size of 0.1 μm for testing. However, according to this preferred embodiment of the invention, a particle size of 0.3 μm is used for measuring PFE performance but otherwise the test procedure shall fully follow ASTM F2299. The PFE of the face mask may decrease with each additional home laundering and tumble-dry cycle but may be kept at a still acceptable level for up to at least 50 home laundering and tumble-dry cycles as explained in more detail further below.

Furthermore, according to a preferred embodiment of the invention, the inner layer is made from a material which shows a bacterial filtration efficiency (BFE) of 95% or more, preferably of 97% or more, most preferably of 99% or more, for particles with a particle size of 3 μm at a flow rate of 28.3 l/m, wherein the BFE is determined according to the ASTM F2101 standard and wherein the BFE relates to the filter of the unwashed face mask. The BFE of the face mask may decrease with each additional home laundering and dry-tumbling cycle but may be kept at a still acceptable level for up to at least 50 home laundering and dry-tumbling cycles as explained in more detail further below.

According to a preferred embodiment of the invention, the inner layer is made from a material which shows a differential pressure of less than 5 mm H₂O at an average air flow of 8 l/min for a test area of 4.9 cm², wherein the differential pressure is determined according to the EN14683 standard (Annex C) and wherein the differential pressure relates to the inner layer of the unwashed face mask.

The sandwich layers may be made from different textile materials. According to a preferred embodiment of the invention, the sandwich layers are made from spun bonded polypropylene non-woven material, preferably with a weight in the range from 0.01 kg/m² to 0.1 kg/m². According to another preferred embodiment, the sandwich layers comprise natural fibers, preferably natural fibers according to at least one from the following list: cotton, coir, sisal, pina, agave, abaca, bamboo, linen, hemp, flax, jute, wool, and silk. Further, the sandwich layer may also comprise other synthetic fibers or a blending of synthetic and natural fibers.

It is essential for the invention, that the face mask comprises the compound structure with the inner layer which is sandwiched by the two sandwich layers. According to a preferred embodiment of the invention, the face mask comprises two additional layers, i.e. two outer layers, wherein the compound structure is sandwiched between these two outer layers. Preferably, these outer layers are made of textile material. Preferably, the textile material of the outer layers is woven or knitted. Further, the textile material of the outer layers is preferably made of natural or synthetic fiber.

According to a preferred embodiment of the invention, at least one layer comprises an antimicrobial fabric finish. Preferably, at least one of the sandwich layers and/or the outer layers is provided with such an antimicrobial fabric finish. More preferably, both sandwich layers comprise such an antimicrobial fabric finish.

Further, according to a preferred embodiment of the invention, the outer layer which covers the face mask to the outside, i.e. the outer layer on the far side of the face of the wearer of the mask, comprises a water repellant fabric finish, preferably a durable water repellent fabric finish. In this respect "durable" means that the water repellent fabric finish survives at least 50 home laundering and tumble-dry cycles.

The inner layer and the two sandwich layers to which the inner layer is bonded form a compound structure which may be a non-removable or a removable part of the face mask. Therefore, according one embodiment of the invention, this compound structure is fixedly attached to at least one other part of the face mask, especially to one other layer of the face mask, and, hence, cannot removed from the face mask without the need of ripping it out and, thus, damaging the face mask. However, according to an alternative embodiment of the invention, the compound structure is a removable part of the face mask and, hence, held to the face mask in a detachable manner, preferably by providing a pocket in the face mask for holding the compound structure.

These and other aspects of the invention will be apparent from and elucidated with reference to the embodiments described hereinafter. Such an embodiment does not necessarily represent the full scope of the invention, however, and reference is made therefore to the claims and herein for interpreting the scope of the invention.

DETAILED DESCRIPTION OF THE DRAWINGS

Figure 1:
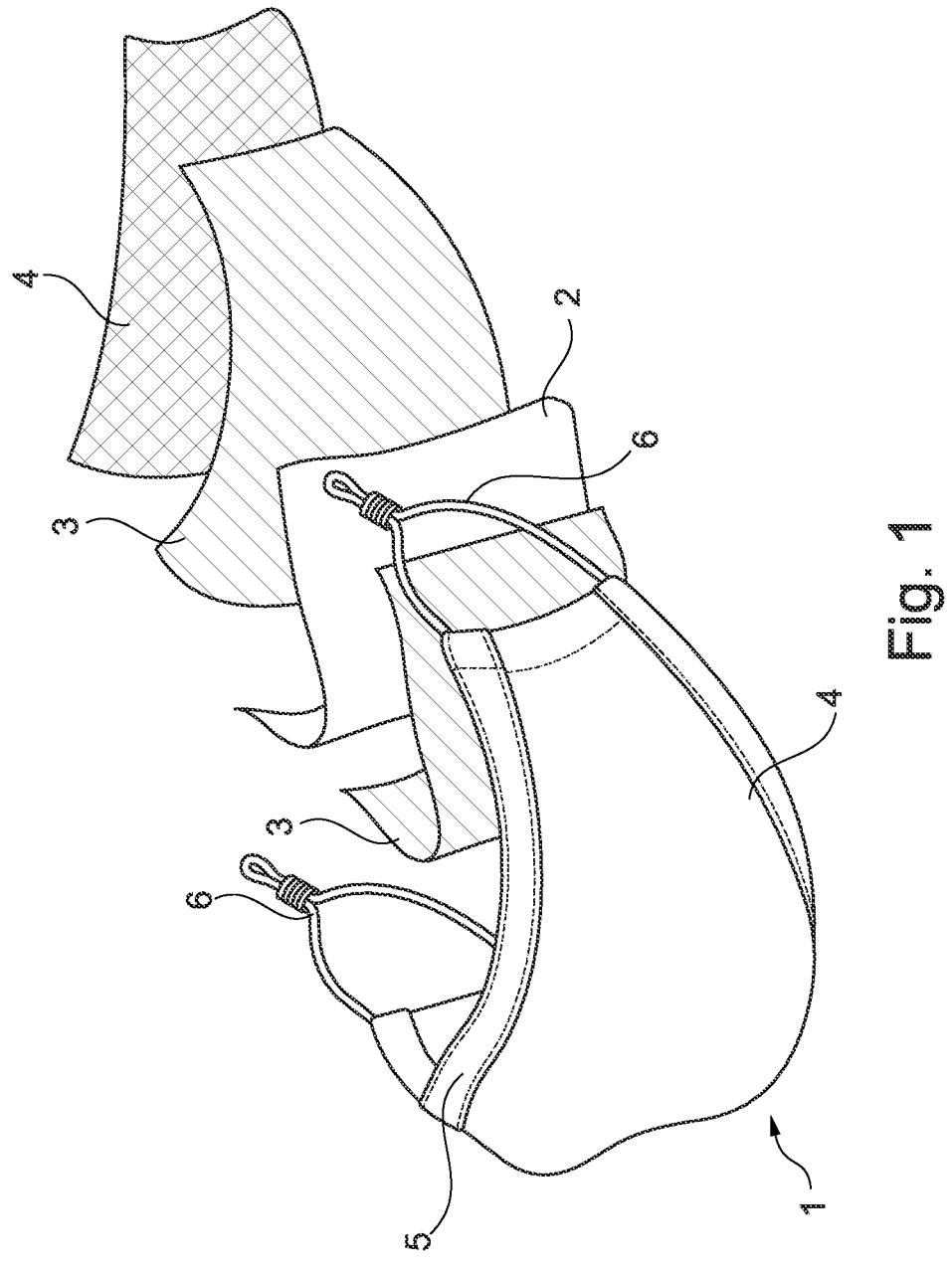
FIG. 1 schematically depicts a three-dimensional exploded view of a face mask according to a preferred embodiment of the invention.

From FIG. 1 which schematically depicts a three-dimensional exploded view of a face mask 1 according to a preferred embodiment of the invention, it can be seen that the face mask comprises a 5-layer structure: The face mask 1 comprises a compound structure with an inner layer 2 and two sandwich layers 3. While the inner layer 2 is made from a filter material for filtering particles and germs, the sandwich layers 3 are made from a textile material. As shown in FIG. 1, the inner layer 2 is sandwiched by the sandwich layers 3. In addition, as explained in more detail further below, the sandwich layers 3 are stitched to the inner layer 2 in sections along the perimeter of the face mask 1. Further, the sandwich layers 3 are bonded to the inner layer 2 in the inner area of the face mask 1 by heat and pressure as well as by ultrasound bonding.

This structure of the inner layer 2 which is sandwiched by the sandwich layers 3 is covered from both sides by outer layers 4 which are made from a textile material. The textile material of these outer layers 4 may be woven or knitted, and the textile material of the outer layers may be made of natural or synthetic fiber. Further, both of the sandwich layers 3 comprises an antimicrobial fabric finish, and the outer layer 4 which covers the face mask 1 to the outside comprises a durable water repellant fabric finish. Furthermore, for good fit of the face mask 1, a flexible nose bridge 5 is provided. For holding the face mask 1 in the face of the wearer, ear loops 6 which made from a flexible material are provided.

The inner layer 2 is designed in such a way that it shows a particle filtration efficiency (PFE) of more than 99% for particles with a particle size of 0.3 μm, wherein the PFE is determined according to the ASTM F2299 standard and wherein the PFE relates to the inner layer 2 of the unwashed face mask 1. As mentioned above, the ASTM F2299 standard refers to a particle size of 0.1 μm for testing. However, according to this preferred embodiment of the invention, a particle size of 0.3 μm is used for measuring PFE performance but otherwise the test procedure shall fully follow ASTM F2299.

Further, the material of the inner layer 2 shows a bacterial filtration efficiency (BFE) of more than 99% for particles with a particle size of 3 μm at a flow rate of 28.3 l/m, wherein the BFE is determined according to the ASTM F2101 standard and wherein the BFE relates to the filter of the unwashed face mask. Furthermore, the material of the inner layer 2 shows a differential pressure of less than 5 mm $H_2O$ at an average air flow of 8 l/min, wherein the differential pressure is determined according to the EN14683 standard (Annex C) and wherein the differential pressure relates to the inner layer 2 of the unwashed face mask 1. In this respect, according to the preferred embodiment of the invention described here, the inner layer 2 is made from a melt-blown polypropylene non-woven material. According to this preferred embodiment of the invention, the sandwich layers 3 are made from spun bonded polypropylene non-woven material in light weight, i.e. with a weight in the range from 0.01 kg/m$^2$ to 0.1 kg/m$^2$.

According to the preferred embodiments of the inventions described here, there are two methods for bonding the sandwich layers 3 to the inner layer 2 in sections along the perimeter of the face mask 1 and in sections in the inner area of the face mask 1, namely a) bonding the sandwich layers 3 to the inner layer 2 by a heat and pressure treatment, especially over the entire surface on which they lie next to each other; and, in the alternative, and b) bonding the sandwich layers 3 are to the inner layer 2 by ultrasound bonding, especially along ultrasound bonding rows which run through the inner area of the face mask from one point on the perimeter to another point of the perimeter.

A very high washing durability is achieved when these two methods are combined.

Figures 2A, 2B:
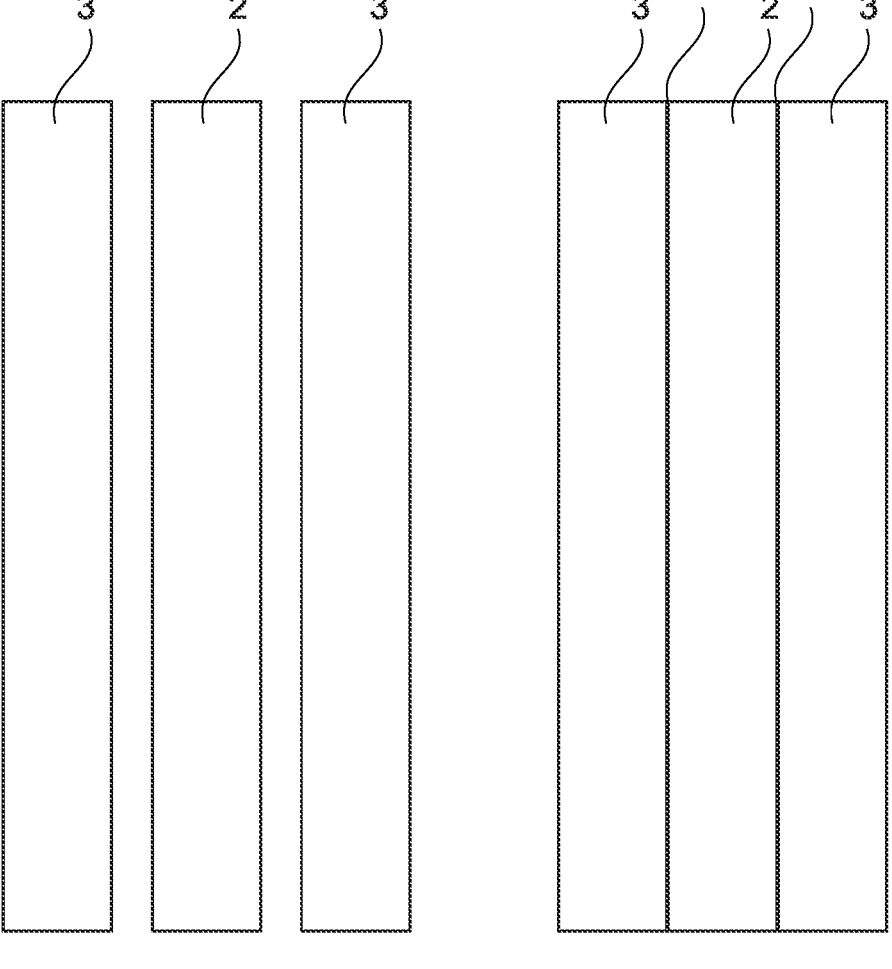
FIG. 2A schematically depict the structure of the inner part of a face mask according to a preferred embodiment of the invention before bonding with heat and pressure.
FIG. 2B schematically depict the structure of the inner part of a face mask according to a preferred embodiment of the invention after bonding with heat and pressure.

Method a) is schematically depicted in FIGS. 2A and 2B, wherein FIG. 2A shows a cross-sectional schematic view of the inner layer 2 and the sandwich layers 3 before bonding, and FIG. 2B shows a cross-sectional schematic view of the inner layer 2 and the sandwich layers 3 after bonding. According to the preferred embodiment of the invention described here, this bonding process is performed with a temperature in the range between 95 and 130° C. and with pressures in the range of 1 to 15 N/cm$^2$. As schematically depicted in FIG. 2B, this bonding by heat and pressure leads to continuous two-dimensional heat and pressure bonds 7 between the inner layer 2 and the sandwich layers 3, respectively.

Figures 3A, 3B:
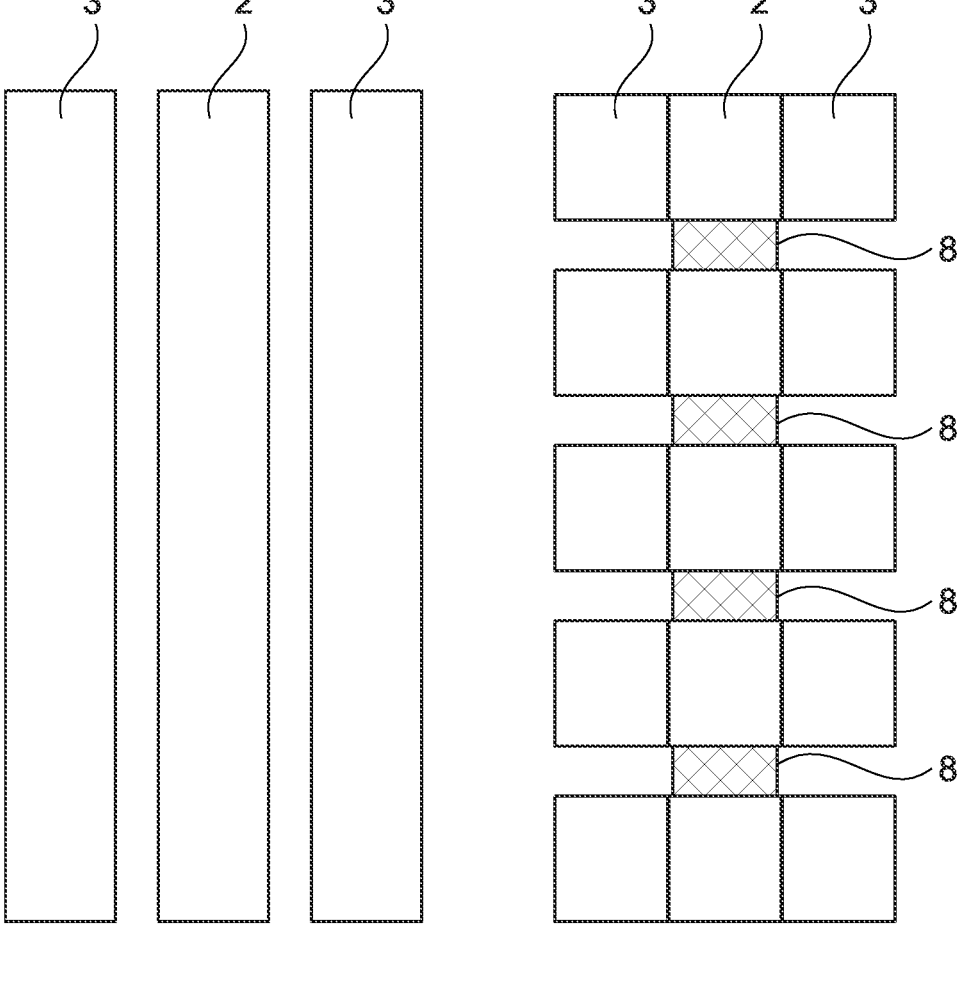
FIG. 3A schematically depict the structure of the inner part of a face mask according to a preferred embodiment of the invention before ultrasound bonding.
FIG. 3B schematically depict the structure of the inner part of a face mask according to a preferred embodiment of the invention after ultrasound bonding.
Figures 4A, 4B, 4C, 4D:
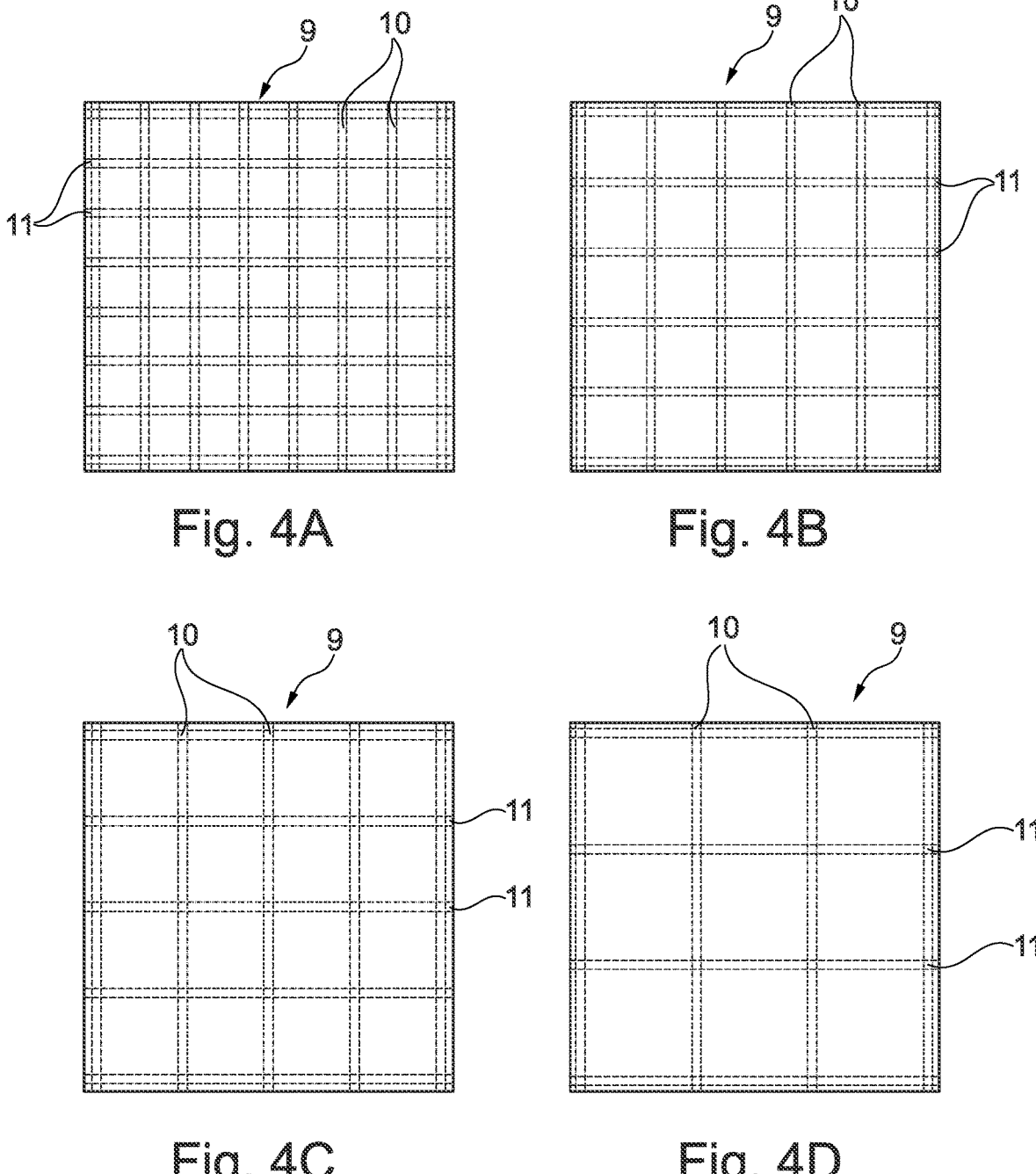
FIG. 4A schematically depict the structure of pairs of ultrasound bonding rows which run through the inner area of the face mask according to one preferred embodiment of the invention.
FIG. 4B schematically depict the structure of pairs of ultrasound bonding rows which run through the inner area of the face mask according to another preferred embodiment of the invention.
FIG. 4C schematically depict the structure of pairs of ultrasound bonding rows which run through the inner area of the face mask according to yet another preferred embodiment of the invention.
FIG. 4D schematically depict the structure of pairs of ultrasound bonding rows which run through the inner area of the face mask according to another preferred embodiment of the invention.

Method b) is schematically depicted in FIGS. 3A and 3B, wherein FIG. 3A shows a cross-sectional schematic view of the inner layer 2 and the sandwich layers 3 before ultrasound bonding, and FIG. 3B shows a cross-sectional schematic view of the inner layer 2 and the sandwich layers 3 after ultrasound bonding. This ultrasound bonding process is similar to the method for fixing ear loops to conventional surgical face masks. In this way, ultrasound bonds 8 between the inner layer 2 and the sandwich layers 3, respectively, at respective bonding spots are achieved which fix the inner layer 2 and the sandwich layers 3 together. Between these ultrasound bondings 8, the inner layer 2, in general, may be loose from the sandwich layers 3. However, as mentioned above, a very high washing durability of the mask is achieved if methods a) and b) are combined. Then, the inner layer 2 is also bonded to the sandwich layers 3 in the areas between the ultrasound bondings 8, i.e. due to the heat and pressure bonding.

As schematically depicted in FIGS. 4A to 4D, in the sandwich structure 9, which is comprised of the sandwich layers 3 and the inner layer 2, the sandwich layers 3 are bonded to the inner layer 2, along ultrasound bonding rows 10, 11 which run through the inner area of the face mask from one point on the perimeter to another point of the perimeter of the face mask 1 in horizontal and vertical direction, respectively. FIGS. 4A to 4D respectively, only show part of a complete face mask 1. Therefore, the perimeter of the face mask 1 is not depicted in FIGS. 4A to 4D. The ultrasound bonding rows 10, 11 are arranged as pairs of ultrasound bonding rows 10, 11 which are parallel to each other and which have a distance from each other which is smaller than the distance of one ultrasound bonding row 10, 11 of the pair of ultrasound bonding rows 10, 11 to the next closer ultrasound bonding row 10, 11 of another pair of ultrasound bonding rows 10, 11. All pairs of ultrasound bonding rows 10, 11 run parallel to their neighboring pairs of ultrasound bonding rows 10, 11. FIGS. 4A to 4D show a compound structure 9 in which the distance between neighboring ultrasound bonding rows is approx. 1.27 cm, 2.54 cm, 3.81 cm and 5.08 cm, respectively.

Figures 5A, 5B, 5C:
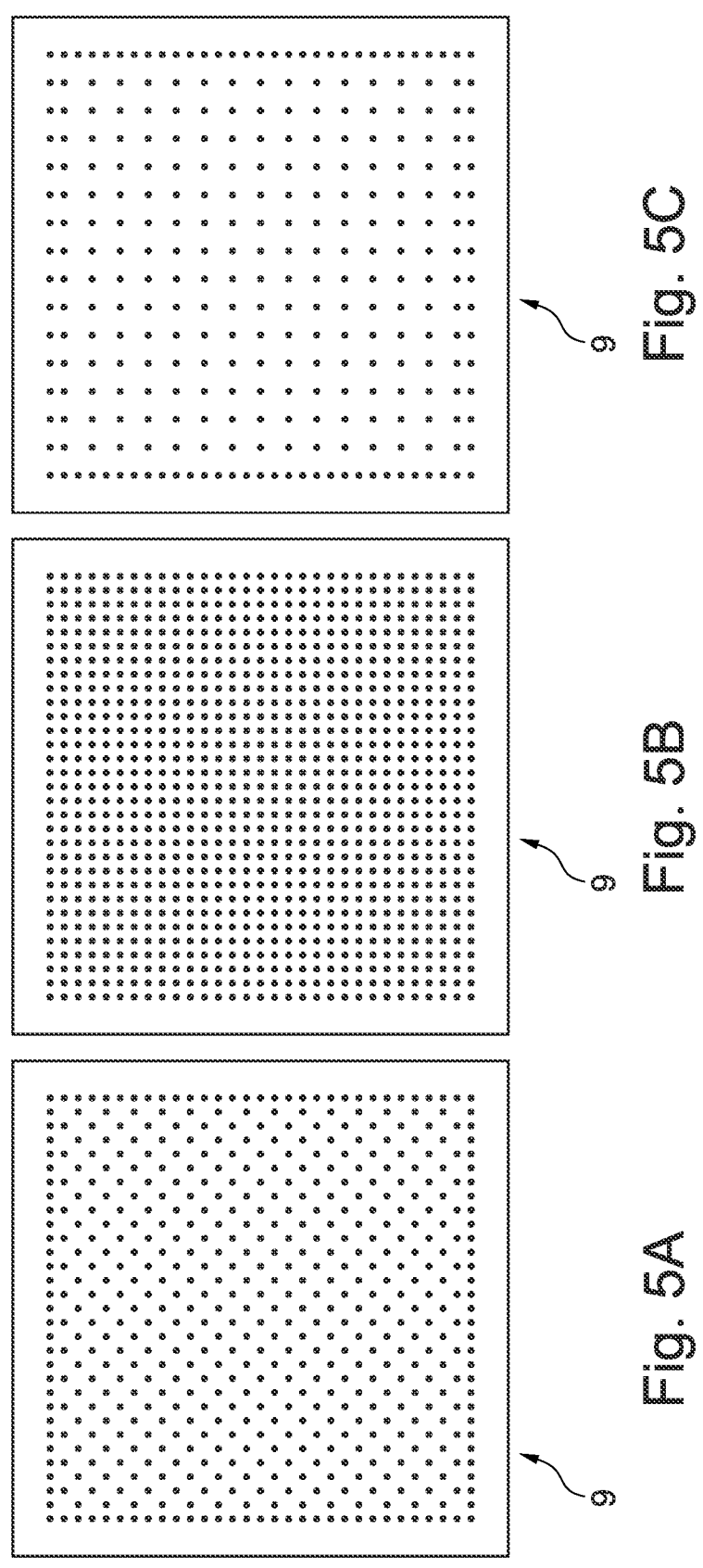
FIG. 5A schematically depict the structure of single ultrasound bonding rows which run through the inner area of the face mask according to one preferred embodiment of the invention.
FIG. 5B schematically depict the structure of single ultrasound bonding rows which run through the inner area of the face mask according to another preferred embodiment of the invention.
FIG. 5C schematically depict the structure of single ultrasound bonding rows which run through the inner area of the face mask according to yet another preferred embodiment of the invention.

Further, as schematically depict in FIGS. 5A to 5C, also single ultrasound bonding rows which run through the inner area of the face mask may be used according to different preferred embodiments of the invention. In FIG. 5A, the rows run diagonally through the sandwich structure 9 while in FIGS. 5B and 5C the rows run vertically and horizontally through the sandwich structure. For the sake of clarity, in FIGS. 5A to 5C reference signs for these rows of ultrasound bondings are omitted. From FIGS. 4A to 4D and from FIGS. 5A to 5C, it can be seen that ultrasound bondings are provided in almost the complete area of the sandwich structure 9, i.e. in the area in which the inner layer 2 is sandwiched by the sandwich layers 3.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope. Further, for the sake of clearness, not all elements in the drawings may have been supplied with reference signs.

REFERENCE SYMBOL LIST face mask 1
inner layer 2
sandwich layers 3
outer layers 4
flexible nose bridge 5
ear loops 6
heat and pressure bonds 7
ultrasound bonds 8
compound structure 9
ultrasound bonding rows 10
ultrasound bonding rows 11

The invention claimed is:

1. A face mask comprising a compound structure with an inner layer and two sandwich layers, wherein
the inner layer is made from a filter material for filtering particles and germs,
the sandwich layers are made from a textile material,
the inner layer is sandwiched by the sandwich layers, and
the sandwich layers are bonded to the inner layer in an inner area of the sandwich layers by application of a heat and pressure treatment over the entire surface on which they lie next to each other.

2. The face mask according to claim 1, wherein the sandwich layers are additionally bonded to the inner layer in the inner area of the sandwich layers by ultrasound bonding.

3. The face mask according to claim 2, wherein the sandwich layers are bonded to the inner layer along ultrasound bonding rows which run through the inner area of the face mask from one point on the perimeter to another point of the perimeter.

4. The face mask according to claim 3, wherein the ultrasound bonding rows are comprised of ultrasound bonding connections of the sandwich layers with the inner layer, the ultrasound bonding connections of one ultrasound bonding row being arranged at a distance from each other.

5. The face mask according to claim 4, wherein the ultrasound bonding rows are arranged as pairs of ultrasound bonding rows; the pairs of ultrasound bonding rows are parallel to each other and have a distance between the ultrasound bonding rows comprising the pair that is smaller than the distance between the next pair of ultrasound bonding rows.

6. The face mask according to claim 4, wherein the ultrasound bonding rows are arranged as single ultrasound bonding rows which run parallel to each other and which are equally spaced from each other.

7. The face mask according to claim 1, wherein the inner layer is made from a melt-blown non-woven material.

8. The face mask of claim 7, wherein the melt-blown non-woven material is a melt-blown polypropylene non-woven material.

9. The face mask according to claim 1, wherein the sandwich layers are made from spun bonded polypropylene non-woven material.

10. The face mask according to claim 9, wherein the weight of each of the sandwich layers is in the range from $0.01 \text{ kg/m}^2$ to $0.1 \text{ kg/m}^2$.

11. The face mask according to claim 1, wherein the compound structure is sandwiched between two outer layers made of textile material.

12. The face mask according to claim 11, wherein the textile material of the two outer layers is woven or knitted, and the textile material of the outer layers is made of natural or synthetic fiber.

13. The face mask according to claim 1, wherein at least one of the sandwich layers or the inner layer comprises an antimicrobial fabric finish.

14. The face mask according to claim 1, wherein an outer layer that covers the face mask to the outside comprises a water repellant fabric finish.

15. A face mask comprising a compound structure with an inner layer and two sandwich layers, wherein the inner layer is made from a melt-blown polypropylene non-woven material for filtering particles and germs,
the sandwich layers are made from a spun bonded polypropylene non-woven material,
the inner layer is sandwiched by the sandwich layers, and
wherein the weight of each sandwich layers is in the range from $0.01 \text{ kg/m}^2$ to $0.1 \text{ kg/m}^2$, and
wherein the compound structure is sandwiched between two outer layers which made of a textile material,
wherein the sandwich layers are bonded to the inner layer in an inner area of the sandwich layers by application of a heat and pressure treatment over the entire surface on which they lie next to each other.

16. The face mask of claim 1, wherein the filter material for filtering particles and germs is different from the textile material.

* * * * *